United States Patent [19]

Rocher et al.

[11] 3,754,211

[45] Aug. 21, 1973

[54] FAST ERROR RECOVERY COMMUNICATION CONTROLLER

[75] Inventors: Edouard Y. Rocher, Ossining; Stanley E. Schuster, Granite Springs, both of N.Y.

[73] Assignee: International Business Machine Corporation, Armonk, N.Y.

[22] Filed: Dec. 30, 1971

[21] Appl. No.: 214,197

[52] U.S. Cl. .......................................... 340/146.1 BA

[51] Int. Cl. ......................... G08c 25/00, G06f 11/00

[58] Field of Search ............ 340/146.1 BA, 146.1 C, 340/172.5; 178/23 A

[56] References Cited

UNITED STATES PATENTS

| | | | |
|---|---|---|---|
| 3,312,937 | 4/1967 | Van Duuren | 340/146.1 BA |
| 3,396,368 | 8/1968 | Lakhani | 178/23 A |
| 3,648,256 | 3/1972 | Zygielbaum et al. | 340/146.1 BA |
| 3,676,846 | 7/1972 | Busch | 340/146.1 BA |

*Primary Examiner*—Charles E. Atkinson
*Attorney*—Victor Siber et al.

[57] ABSTRACT

This is a communication controller that is utilized in a network consisting of a plurality of terminal stations, each station capable of transmitting and receiving digital messages. All stations within the system contain a communication controller which detects address or data errors. Properly decoded address and data message information initiates an acknowledgement response from receiving terminal stations. The presence of an address or data error initiates no response from the receiving station. The transmitting station contains automatic means for retransmitting a message if an acknowledgement is not received from the addressed receiver station within a minimum cycle-out period. The communication controller contains automatic means for discarding received messages which are a duplicate of a prior received and properly decoded message.

6 Claims, 6 Drawing Figures

FAST ERROR RECOVERY COMMUNICATION CONTROLLER

RELATED PATENT APPLICATIONS

This application incorporates by reference application Ser. No. 158,320 entitled, "Loop Switching Teleprocessing Method and System Using Switching Interface," filed June 30, 1971.

BACKGROUND OF THE INVENTION

This invention relates to a digital data communication system and an apparatus and method for fast error recovery of address and data errors. More particularly, the invention relates to either a point-to-point or multipoint communication system wherein a plurality of digital terminals are connected to each other by communication paths, wherein message errors are treated on a non-acknowledgement basis.

PRIOR ART

Referring now to FIG. 1, there is shown a state diagram representing the series of communications and possible error conditions which may occur during transmission of messages between two terminals in a prior art "point-to-point" communications network. For the purpose of illustration, only two terminals shall be discussed herein, terminal A and terminal B. However, it should be recognized that the communications network may have any number of terminals interconnected in a "multi-point" network as described in U. S. Pat. No. 3,245,038, entitled "Central to Remote Communication System with Address Modification for the Remote Stations," filed June 30, 1961, and assigned to the same assignee as the present application. In that communications network, a plurality of terminal devices each capable of transmitting and receiving digital messages to and from a communication channel are disclosed.

Generally, in the prior art communication systems, message error checking and recovery is accompanied by transmitting acknowledgement (ACK) or negative acknowledgement (NACK) messages in response to received messages. Furthermore, it is known that terminal synchronization may be maintained by means of an odd-even message switch present at each terminal device, which switch is correlated with the odd-even state of a received message.

The illustration in FIG. 1 shows a state diagram of a communication sequence between two terminals. FIG. 1 further shows the odd-even synchronization states of each of the terminal devices as they relate to the receipt and transmission of messages and the corresponding ACK or NACK signals. Each quadrant in the figure represents one out of the four possible combinations of odd-even synchronization states for two terminals. For the purpose of simplicity, the description herein refers to two terminals identified as A and B. However, it should be understood that this is merely illustrative and the principles may be applied to a large number of terminals.

Now with reference to FIG. 1, the case of error-free communication between A and B is considered. First, message D1(O) is transmitted from terminal A which is in the odd state, as indicated by the notation A(O), to terminal B which is in synchronism and in the even state as represented by the notation B(E). For the purpose of illustration, the notation used herein is (O) representing the odd state and (E) representing the even state. The message D1(O) is received by terminal B, and after decoding proper address and data, terminal B switches to the odd state and responds to terminal A by sending an ACK message back to terminal A. When terminal A decodes the received ACK signal, it switches its synchronization state to even, A(E). The receipt of the ACK signal indicates to terminal A that it may proceed by transmitting the next message D2(E). This message D2(E) is then received by terminal B which is now in the odd state. After decoding D2(E), terminal B determines that the message is correct and in synchronization, switches back to the even state and responds by transmitting an ACK message to terminal A. In this manner, communications between terminal A and terminal B continue indefinitely until there are no more messages to be sent.

The state diagram of FIG. 1 illustrates in each of the quadrants, the possible error conditions which may exist between terminals A and B. There are two classes of errors which may exist: (1) an erroneous message decoded by the receiving terminal, or (2) a lost or erroneous acknowledgement message.

Beginning with the quadrant I, and considering the first transmission of data block D1(O), the first error which is encountered is the receipt of an erroneous message block D1(O) by terminal B. Terminal B(E) is in the even synchronization state prior to receipt of the odd message D1(O). In the state diagram, the dashed line indicates an erroneous transmission. In this case, the error is of an unknown nature which would be detected by the presence of an erroneous check character. In response to this error detection, terminal B sends a NACK message back to terminal A to request retransmission of message block D1(O). If a subsequent retransmission by terminal A is received correctly, the communication between A and B will return back to the normal path of quadrant II. However, as long as an error continues to be detected by the receiving terminal B(E), communications will remain in the loop shown in quadrant I. A similar erroneous transmission loop may be entered in any of the other three quadrants II, III and IV. Note, that all erroneous transmission loops are broken by an error-free transmission which returns communications back to the normal state.

Now, the case of an erroneous NACK message transmission is considered. This class of error occurs after both terminals are in the same synchronization state, indicating that the prior message was properly decoded. If in response to an error-free message transmission, either terminal A or terminal B sends an ACK message which is garbled or lost, the transmitting terminal retransmits the previously sent message. Considering the quadrant II, for example, data message D1(O) is retransmitted from terminal A to terminal B until a proper ACK message is received by terminal A which would then switch A(O) to A(E) as shown by the transition into the quadrant III of FIG. 1. Similar to the message errors, the ACK errors may also cause entry into a loop until error-free transmission is possible. After the error is no longer present communications return back to the normal path.

It should be noted, that this prior art error recovery system is based upon the principal of using a positive request by the terminal units to cause retransmission messages. If a message is totally lost in a multi-point environment, this positive type control is very time consuming in that it requires maximum loop transmission time to detect or recover from an error. Furthermore, in the prior art systems there is a high probability of loosing synchronization. Furthermore, recovery from addressing errors would require a complex process with additional apparatus in the terminal to carry out the recovery procedure.

OBJECTS OF THE INVENTION

Therefore, it is an object of the present invention to quickly detect and recover from errors associated with message frames being transmitted in a communication network.

It is a further object of the present invention to utilize the same error detection and recovery means for data and address errors.

It is a further object of the present invention to eliminate the need of a no-acknowledgment response from terminals detecting a message error.

It is a further object of the present invention to automatically retransmit message frames which are considered to have not been properly received at the intended destination within a minimum cycle time.

SUMMARY OF THE INVENTION

In the present invention a communications controller for quickly detecting and recovering from addressing and data errors contained in a message frame is provided. Error-free message frames are responded to by a receiving terminal with an acknowledgment (ACK) message. Erroneous or error identified messages are ignored by the receiving terminal.

The communications controller is a part of every terminal in the communications network. Synchronization between communicating terminals is accomplished by the inclusion of an odd-even synchronization bit in each message frame, which bit corresponds to the synchronization state of the transmitting terminal. Synchronization errors are handled by discarding all data contained in the message frame. However, assuming that the data contained in a message frame which is out of syncnronization does not contain any data errors, the receiving terminal will respond with an ACK message.

Data or addressing errors in message frames are identified, for example, by means of a cyclic check character generated at the transmitting station and included as a trailer to the data contained in the message frame. A reconstructed cyclic check character is generated at the receiving terminal. Then, a comparison is performed between the received cyclic check character and the reconstucted cyclic check character. If the comparison indicates an error in the message frame, then the information which has been passed to the terminal is erased and the terminal does not respond with an ACK message.

The communications controller in the transmit mode activates a cycle-out at the end of which an ACK message should be received in response to a prior transmitted message frame. If an ACK is not received within the cycle-out time period, the transmitting terminal assumes a lost or erroneous message or a lost or erroneous ACK and issues a retransmitted message frame. In this manner both address and data which comprise the binary information in the frame are treated in the same manner, with an identical error recovery technique.

DETAILED DESCRIPTION OF THE INVENTION

Figure 2:
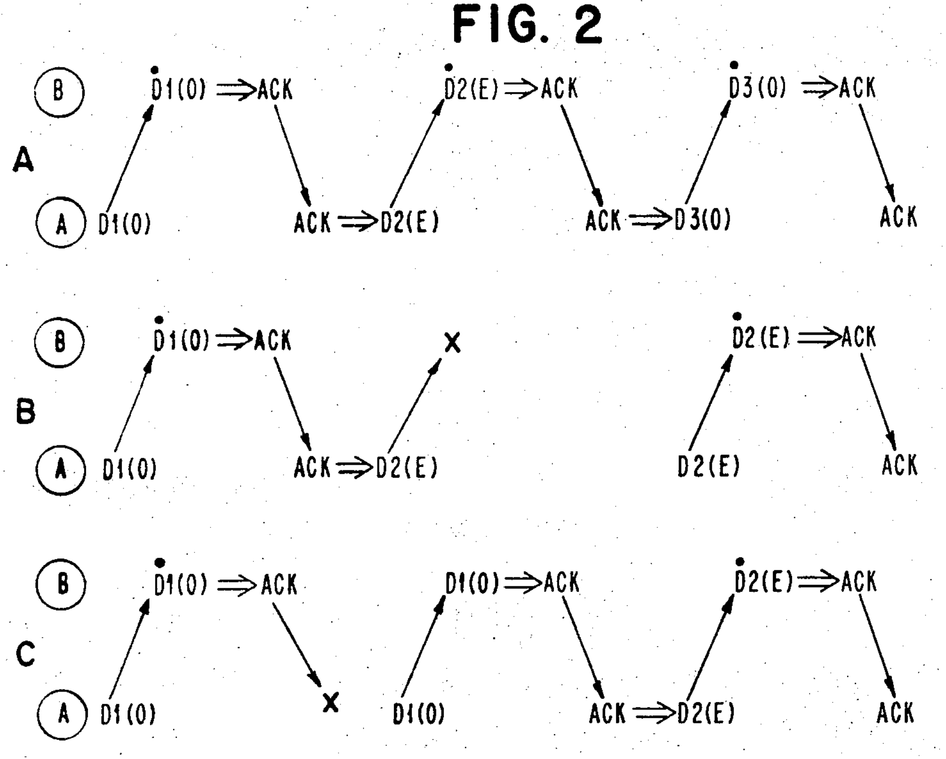
FIG. 2 is an illustration of the three possible cases of transmission sequences between two terminals in the case of the present invention.

Now referring to FIG. 2, there is shown a series of communications between terminals A and B as they would take place in the preferred embodiment under the following conditions: (a) error-free transmission; (b) a lost or erroneous message frame, and (c) a lost or erroneous acknowledgment frame. In FIG. 2, terminals A and B are identified by the circled letters A and B, and properly received data messages which are accepted by the terminals are identified by the dot appearing over the data message (Ḋ). First considering condition (a), it is assumed that terminal A is in the odd state. Therefore, the first message block contains an odd synchronization associated with it and is identified as D1(O). This message block is properly received and accepted by terminal B with no errors present, as indicated by Ḋ1(O). In response to receipt of this message block, terminal B transmits an ACK message back to terminal A which then initiates a switching of the synchronization state at terminal A from odd to even. After switching to the even state, terminal A transmits message block D2(E) to terminal B. In a similar manner, as with respect to D1(O), terminal B continues to acknowledge for all properly decoded messages by responding with an ACK message. Note, that transmitting terminals switch synchronization state upon proper receipt of an ACK signal and receiving terminals switch synchronization state upon proper decoding of a message block.

Now, considering condition (b), there is shown the case where a message block D is lost or garbled in transmission from terminal A to terminal B. It should be recognized, that while the discussions herein refer to two terminals, the principles discussed may be readily extended to any number of terminals which are connected in the communication network. Again, data block D1(O) is sent from A to B, properly decoded, and responded to by an ACK signal. The second message block D2(E) is then sent from A to B and lost in transmission or received by B with an error as indicated by the symbol X. The preferred embodiment contains an automatic cycle-out which is some minimum time period, for anticipating the receipt of an ACK message in response to a transmitted message block D2(E). Since the ACK is not received within the cycle, A retransmit D2(E) which is then properly decoded Ḋ2(E).

Referring now to condition (c), there is shown the sequence of transmitting blocks of data from terminal A to terminal B with terminal B responding with an ACK message after receipt of a properly decoded message D1(O). In this case, there is illustrated the error recovery procedure for a lost transmission D2(E). In a similar manner, to the error-free transmission case of FIG. 2A, data block D1(O) is transmitted and properly responded to by terminal B with an ACK message. Upon receipt of the ACK at terminal A, message block D2(E) is transmitted from terminal A to terminal B with an even synchronization sign and is assumed to be lost as illustrated by the nota-tion X. The lost transmission may be caused by either a data bit error or addressing bit error which would erroneously force the message frame to be decoded at a terminal other than terminal B.

After the transmission of D2(E) by terminal A, terminal A enters a pre-specified wait period within which the expected ACK message from terminal B should be returned. If after expiration of the cycle wait period, an ACK has not been received, terminal A retransmits message D2(E) as indicated in FIG. 2B. Assuming that the second transmission is error free, terminal B responds with the appropriate ACK message as shown. However, it should be recognized that message D2(E) would be repeated or retransmitted as many times as required to achieve an error-free transmission. Since terminal B switches synchronization state only upon proper receipt of an error-free message, synchronization between terminal B and terminal A is maintained throughout this error recovery procedure. The prespecified time period for the wait of the ACK message, is a minimum time which is determined from the characteristics of the communications network. For example, in the loop switching system disclosed in application Ser. No. 158,320, the time wait period is the amount of time which transpires until a P1, P2 character combination reappears at the transmitting station. In that loop switching system, it is known that the transmitting terminal must have received a response prior to the reappearing of the P1,P2 character combination. The reappearance of P1,P2 indicated that the message had enough time to reach the receiving station and furthermore, the receiver had sufficient time to respond with an ACK.

The next case considered as shown in FIG. 2C, is the situation where the acknowledgement message is lost in transmission. In this case, message D1(O) is properly decoded at the receiving terminal B and the appropriate acknowledgement message is sent back to terminal A. The ACK is then lost in transmission so that terminal A never receives it. Similar to the lost data block case of FIG. 2B, terminal A enters a time period wait for the acknowledgement to its transmitted message D1(O). Since the ACK message is lost, the time period expires and terminal A operattes under the assumption that the message D1(O) was never received at terminal B. Accordingly, terminal A retransmits the message block D1(O). This retransmitted message D1(O) is correctly decoded at terminal B and discarded since B has already received and accepted message block D1(O). However, an ACK message is reconstructed and transmitted to terminal A and normal communications resume.

Similar to the prior case, retransmission of the same data block D1(O) would take place as many times as required to achieve error-free transmission. In a like manner, as discussed for case shown in FIG. 2B, the cycle-out for transmitting device A would be achieved by waiting for the P1,P2 character combination of the exemplary loop transmission network disclosed in application Ser. No. 158,320.

Figure 1:
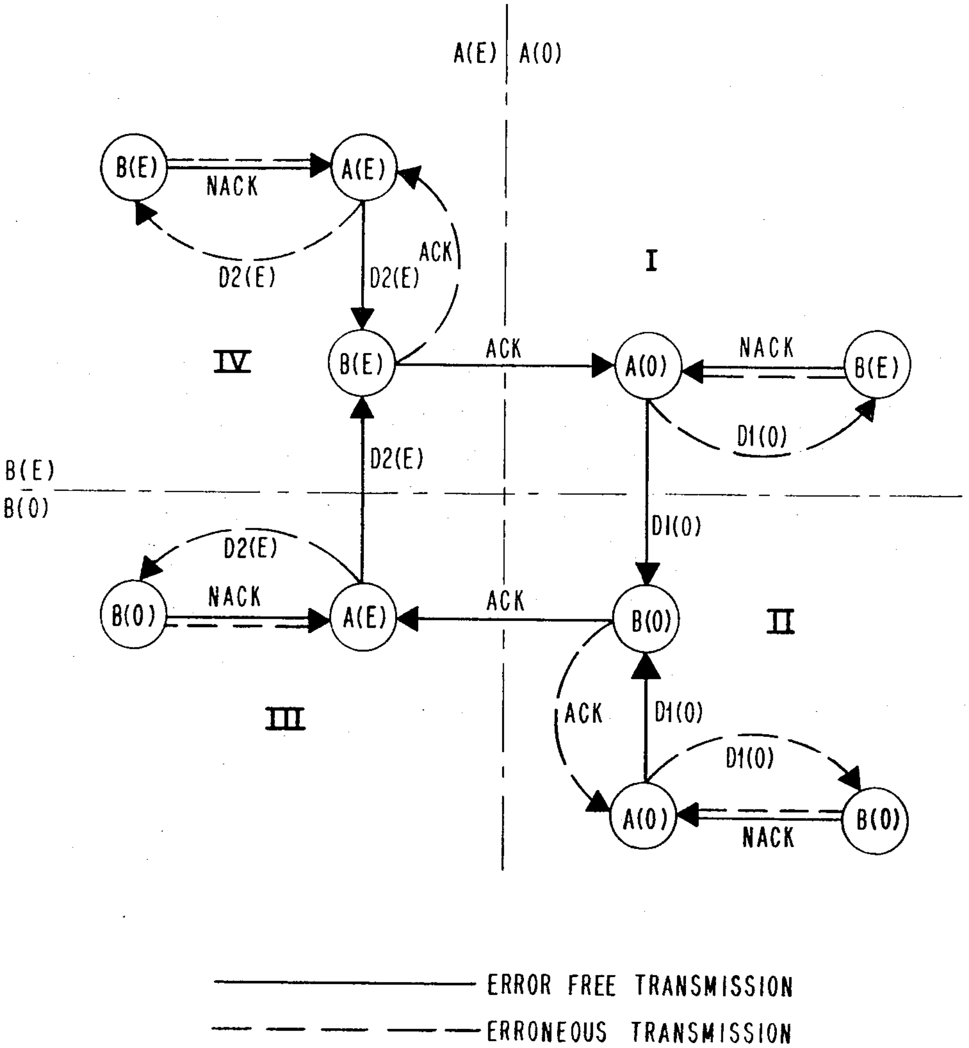
FIG. 1 (PRIOR ART)
FIG. 1 is a state diagram of the sequence of communications between two terminals which utilize a prior art error recovery procedure.
Figure 3:
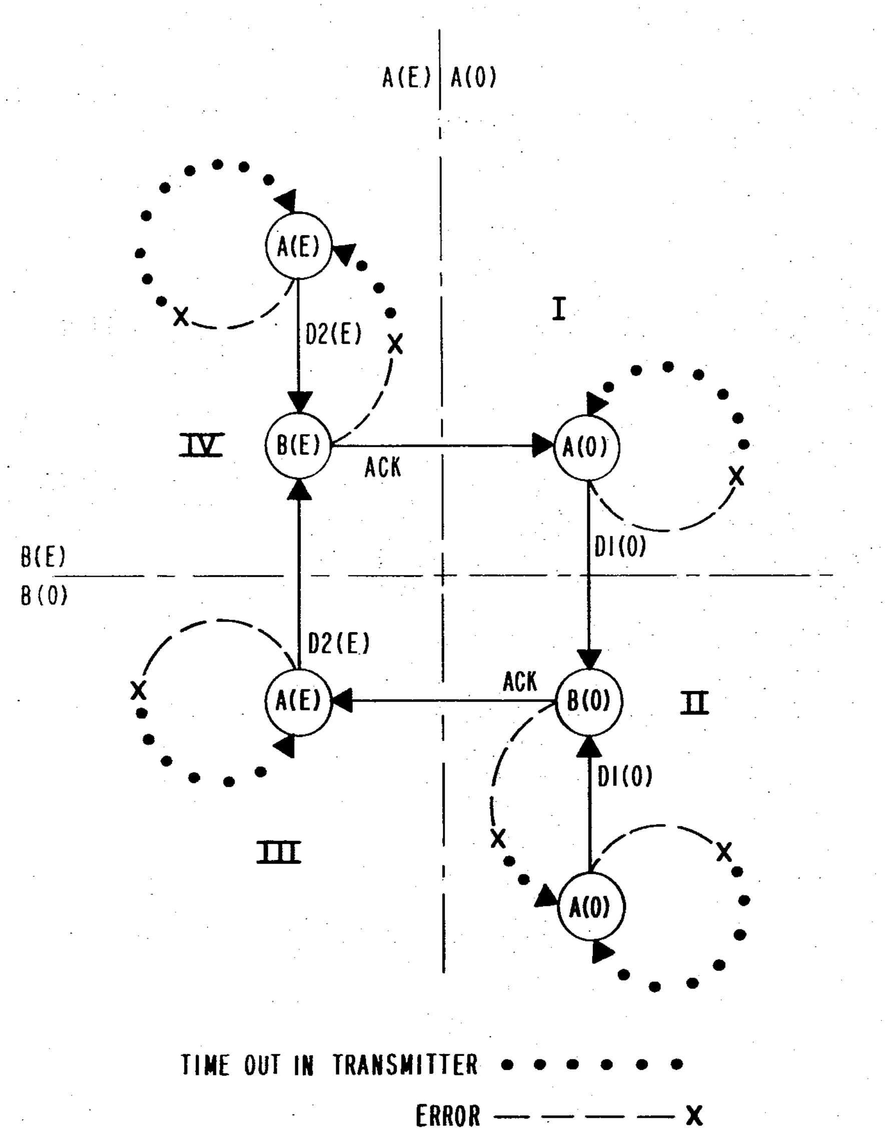
FIG. 3 is a state diagram of the sequence of communications between two terminals in a multi-point system utilizing the instant error recovery procedure.

Now referring to FIG. 3, there is shown a state diagram for communications between terminal A and terminal B under the operation of the preferred embodiment of the invention. The notation used in FIG. 3 is the same as used in the state diagram shown in FIG. 1, with the addition of the dotted transmission path which represents the cycle-out at the transmitter station. As explained above, the cycle-out is executed at the transmitter during expectation of the ACK message from the receiver device. As discussed previously, with reverence to FIG. 1, error-free transmission takes the shortest path about the origin of the four quadrants I, II, III and IV, so that, message D1(O) would be sent from A to B. After being properly decoded at B, an ACK message would be sent from B to A. When the ACK is properly decoded at A, this would trigger the transmission of the subsequent data block D2(E) which is properly received at B. Terminal B responds with an ACK and since B was in the odd synchronization state, it switches to the even synchronization state. This sequence of operations would continue indefinitely until no errors occurred in transmission.

In each of the four quadrants of the state diagram of FIG. 3, there is shown the possible error conditions which can occur in transmission between terminals A and B. First, considering the case in which message block D1(O) is erroneous, as shown in the first quadrant, terminal A(O) repeatedly continues to operate in a cycle-out loop. When a correct ACK message is finally received it causes the A to shift from the odd state to the even state, or in the terms of the state diagram to place terminal A in the third quadrant. As discussed previously with reference to FIG. 2, in a loop transmission system as disclosed in application Ser. No. 158,320 terminal A waits until a reappearance of a P1,P2 character combination is decoded across the interface of the channel. When the P1,P2 combination is decoded, terminal A retransmits message D1(O) and continues to do so until an ACK message from B is received at terminal A. Similar cycle-out loops are shown in quadrants II, III and IV, to represent the possible message frame error conditions which take place during message block transmissions. Now, considering error conditions in the ACK message, reference should be made to the second and fourth quadrants of FIG. 3. In this type of error condition, the ACK which is sent from the receiving terminal to the transmitting terminal in response to a properly decoded message, is lost or garbled. Then, the transmitting station assumes a lost message block and retransmits the message D without changing synchronization state until the proper ACK is received.

In the preferred embodiment of the communication controller disclosed herein, both data and ACK messages are treated in the same manner so as to simplify error detection recovery. By treating data and address errors in this unique manner, complex diagnostic procedures for determining a strategy to recover from an erroneous transmission are eliminated.

Figure 6:
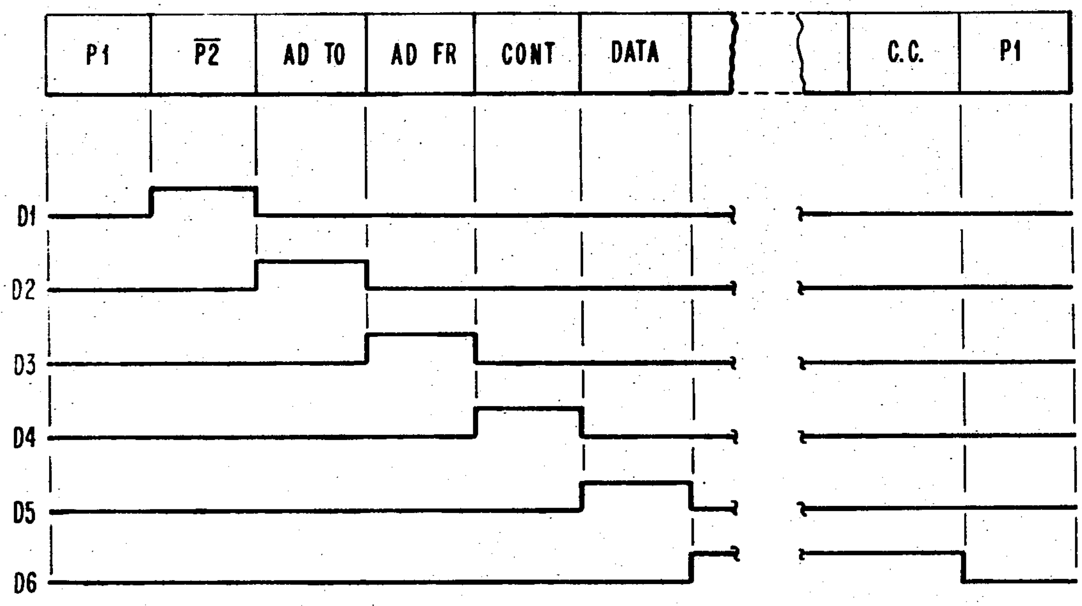
FIG. 6 is an illustration of the digital message frame format utilized by the transmission interface and communications controller.
Figure 4:
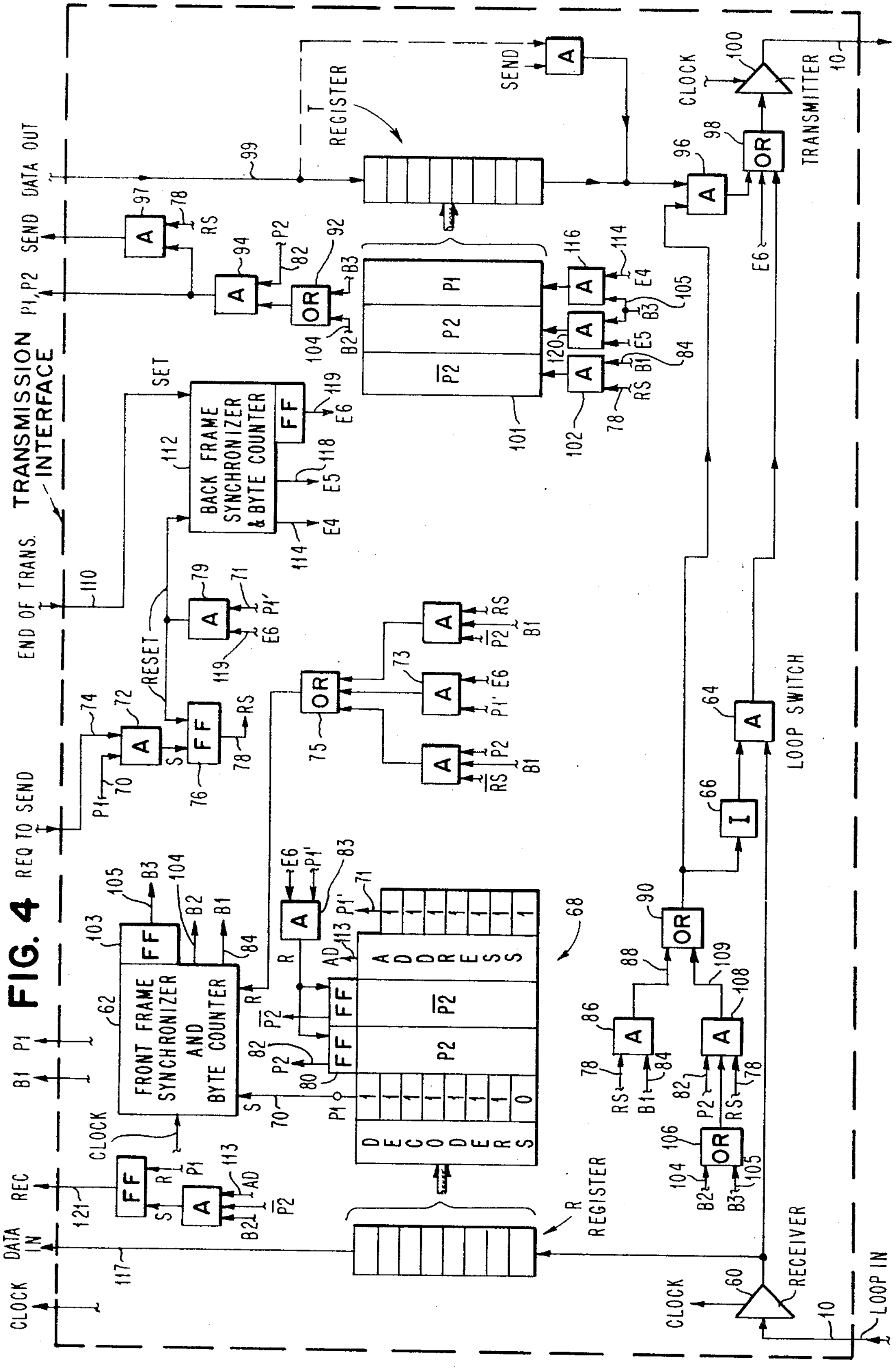
FIG. 4 is a detailed schematic diagram of the transmission interface section of a digital communication terminal that is connected to a communications channel.

For the purpose of describing the communication controller with a communication system environment, the communication controller is disclosed as being utilized within the system of applicatin Ser. No. 158,320, which application is incorporated by reference in the instant application. FIG. 6 of application Ser. No. 158,320, has been reporduced and appears herein as FIG. 4. The schematic diagram of FIG. 4 presents the interface control of devices connected on the loop switching network. This interface control decodes the digital information which circulates on the communication channel. Also, the interface control determines the presence of specified control characters which manage and control terminal access for transmitting or receiving information. As indicated in the application Ser. No. 158,320, each device or terminal contains a receiver and transmitter station connected to the channel. The receiver station decodes and monitors all data communicatiions which pass by on the channel so as to decode the P1,P2 – P1,$\bar{P}$2 character combinations which control message transmission sequences between devices. Receipt by a station of a P1 character followed by a P2 character indicates to that device that it may seize control of the channel and transmit a message. Assuming that the device has information ready to transmit, upon the decoding of the P1 character, the device transmits a $\bar{P}$2 character. If at the same time a P2 character is decoded, then the $\bar{P}$2 character is followed with the message data. If during transmission of the $\bar{P}$2 character, a $\bar{P}$2 character is received, the station resumes the monitor mode and passes the incoming messages down the line. Other devices on the communication channel will then decode the P1 and $\bar{P}$2 characters which indicate that the message frame is occupied and therefore, they may not transmit. After the device is finished transmitting, it will enter a P1,P2 character combination on the line to enable subsequent devices on the line to transmit. The schematic diagram of FIG. 4 shows the circuitry for implementing the P1,P2 control sequences and the transmission of messages onto the channel.

Figure 5:
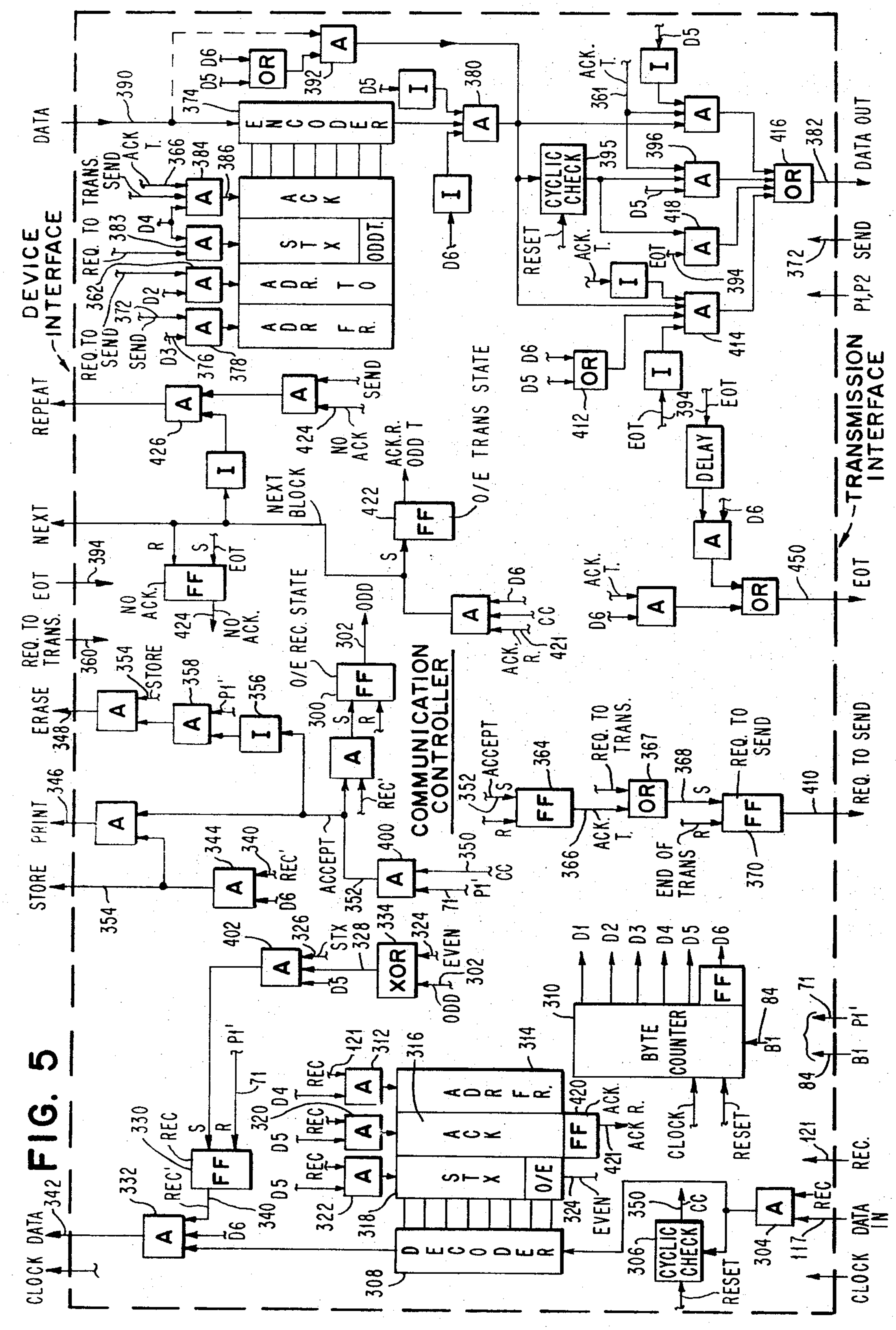
FIG. 5 is a detailed schematic diagram of the preferred embodiment of the communications controller.

The communication controller which provides fast error recovery is shown in FIG. 5. This error recovery system structure is designed to interface with the transmission interface control structure of FIG. 4 and with the device or terminal. Figuratively, the error control system of FIG. 5 is sandwiched between the transmission interface control and the device or terminal hardware. Thus, the lines emanating from the transmission interface are utilized by the error recovery system which communicates with the device hardware. In the following description, reference should also be made to FIG. 6 which illustrates the message frame format and the sequence of time controlled clock signals D1 through D6 which are utilized in the communication controller.

As indicated in FIG. 6, the message frame format consists of six distinct fields. The P1 character which is the prefix for the frame is a framing character which identifies the beginning of the message frame. Following the P1 character, is a P2 or a $\bar{P}$2 which indicate that transmission may or may not be entered into by the decoding terminal. As discussed previously, the P2 character indicates that the frame is empty and the $\bar{P}$2 indicates that the frame is full. After the P2 character, there appears an "address to" (AD TO) character which identifies the address of the device for which the message is intended. The AD TO character is followed by the "address from" (AD FR) character which represents the address of the transmitting station. Following the AD FR character, there is a control character (CONT) for operating the device. The various control characters used in the system are shown in Table I.

TABLE I

| | |
|---|---|
| START OF TEXT (STX) E | 00001100 |
| START OF TEXT (STX) O | 00001101 |
| ACKNOWLEDGE (ACK) | 11110000 |

After the control character, the frame contains all of the message data to be included in the frame. In order to provide a means of checking the transmission of all of the information within the frame, the communication controller contains, for example, cyclic check generating means which processes all binary information within the frame and forms a cyclic check, as before. An exemplary device for generating the cyclic check redundancy code is fully described in a text by W. W. Peterson entitled "Error-Correcting Codes," copyright MIT Press 1961. The cyclic check field is the last piece of information to be included within the frame which is bounded by the P1 character. Thus, after the placement of the cyclic check character on the channel, the interface control presents a P1 character which will be followed by a P2 character to give control to the next station connected on the communication channel.

For the purpose of describing the communication controller shown by FIG. 5, all possible communication states which were discussed previously with reference to FIGS. 2 and 3 will now be considered.

ERROR-FREE TRANSMISSION

The communication controller is present in all terminals within the communication network and interfaces between the device and the transmission interface control that is connected to the communications channel. For the purpose of illustration, the following description will relate to received and transmitted messages with their respective ACK messages from a single device connected in the communications network. It should be recognized by those skilled in the art, that all devices in the network operate in the same manner and that for the purpose of simplicity, the description is limited to one device.

The following discussion will describe both the receive and transmit mode of operation for the communication controller and its interaction with the transmission interface and the device which may be a terminal of any type capable of receiving and sending digital information.

RECEIVE MODE

It is assumed for the purpose of illustration, that the device has been communicating with some other device on the channel and is now prepared to receive some message. The odd-even receive state flip-flop 300 may be in an odd or even state depending on the synchronization state of the last frame received. In this case it is assumed that the flip-flop is in the odd state which would be indicated by the presence of a 1 signal on odd lead 302. If, on the other hand, a 0 signal were present on odd lead 302 it would indicate that the device is in the even synchronization state. Operation of the controller in the receive mode is determined by the decoding of a P1 and $\bar{P}$2 character combination by the interface controller shown in FIG. 4. The decoding of the device address results in the sending of a signal along receive lead 121 indicating to the controller that a message has been received and is to be forwarded to it along data in lead 117. Receive lead 121 opens AND gate 304 so as to permit the information present on data in lead 117 to be passed through the cyclic check generator 306 and to the decoder 308. All data which is passed to the decoder 308 is simultaneously presented to the cyclic check generator 306 which develops a CC signal on lead 350. The CC signal, when 1, determines the absence of an error in the data message frame received.

At the initial decoding of a P1 character in the R register by the transmission interface, the byte counter 310 begins to generate clock control signals D1 through D6. The byte counter is initiated by the B1 signal 84 received from the transmission interface. As may be seen in FIG. 6, the D1 clock time occurs during the decoding of the P2 or $\overline{P2}$ character which designates available frames on the transmission channel. In this case, since the device is in the receive mode, the interface controller has decoded a $\overline{P2}$ character during the D1 clock time. At the end of D1 clock signal, the byte counter 310 generates the D2 clock signal which overlaps the B2 clock signal utilized by the transmission interface to decode the "address to" portion of the message frame in the R register. When the D2 clock signal drops, the byte counter 310 generates the D3 clock signal which is the time interval during which the ADR FR character is contained in the R register. After the D3 clock signal, the byte counter 310 generates a D4 signal which in conjunction with the receive signal on lead 121 operates AND gate 312 at the appropriate time when the ADR FR character has been decoded by decoder 308 and appears in the register 314. Subsequent to the D4 clock time, the byte counter 310 generates a D5 clock signal which is utilized to gate the control character out of the decoder 308.

At clock time D5, the decoder 308 contains the control character byte and the decoder sections ACK 316 and STX 318 are made operative by AND gate 320 and 322, respectively, to compare the particular control codes and recognize either the ACK or STX control character. For the example under consideration, the STX is decoded by decoder 308 and recognized by section 318. The STX section 318 also contains an odd-even field for determining the odd or even synchronization state. Assuming no error in synchronization, the particular frame message received should be in the even state and, therefore, a 0 signal would appear in the odd-even bit in the STX control byte. Accordingly, the lead 324 would be at a 0 or even level with no signal present. The STX control character informs the device that the information after the STX is data.

The ACK control character would be present if the received message frame was an acknowledgement from another terminal that had received and properly decoded a previously sent frame. However, for the present example, it is assumed that the received message is data, and the acknowledgement case will be discussed further in this specification.

The decoding of the STX character presents an STX signal on lead 326 so that at the occurrence of the D5 clock time, in combination with a 1 signal on lead 328, would set the receive flip-flop which opens AND gate 332 during the D6 clock time. Lead 328 presents a 1 signal level when exclusive-or gate 334 senses a different synchronization state signal for the received message frame in relation to the synchronization state of the previously received message frame. That is, the signal level on lead 324 must be opposite the level on lead 302. If the receive flip-flop 330 presents a 1 signal on the REC lead 340 at D6 clock time, then all information is passed through AND gate 332 onto data lead 342 which presents the data to the device.

Simultaneously, during the D6 clock time, AND gate 344 is also activated by the D6 clock signal in conjunction with a 1 signal level on the REC'. The output lead of AND gate 344 presents a 1 signal on lead 354. This store signal on lead 354 indicates to the device that the data introduced along line 342 is to be placed in an intermediate storage until either a print or erase signal is presented along leads 346 or 348, respectively. The print signal on lead 346 would indicate that the information was new and error-free, and thus the device could present the data or utilize the data in a normal manner. However, if the data contains some error (as would be indicated by the CC character), the erase signal on lead 348 indicates to the device to discard the data from the message frame being processed.

The stream of data bytes which follow the STX test character are sequentially passed from the transmission interface through the communications controller to the device until the next frame of information is detected by the transmission interface. The framing character P1 is detected at the interface control and a P1' signal is presented on lead 71. This P1' signal is ANDed with a CC signal on lead 350. The signal CC indicates that no error has been found in the message frame when it is a 1. Both the P1' and CC signals are ANDed by AND gate 400 at D6 clock time and present a 1 signal on the set lead 352 of odd-even receive state flip-flop 300. In the present example under consideration, flip-flop 300 would be switched to the even state, thus presenting a 0 signal on line 302. Simultaneously with the resetting of the odd-even receive state flip-flop 300, the set lead 352 is ANDed with the store signal on lead 354 to provide the print signal too the terminal on lead 346. If the CC signal indicated an error, then the set signal lead 352 would present a 0 value which is inverted by inverter 356 to present a 1 signal level at P1' time to operate AND gate 358 so as to cause an erase signal to be presented to the device on lead 348 if the store signal lead 354 presents a 1 level.

Assuming an error-free transmission, the device would initiate an ACK message to be sent to the transmitting station in response to the received message. A 1 signal lead on lead 352 sets flip-flop 364 so as to cause the generation of an ACK transmit signal on lead 366. The acknowledgement transmit signal is gated through or gate 367 to lead 368 which is the set line for the request to send flip-flop 370. By setting flip-flop 370 to a 1 state, a request to send signal is transmitted from the communication controller to the transmission interface to inform that portion of the terminal to look for a P1 and P2 character combination on channel line 10 so that the ACK message may be transmitted to the appropriate terminal.

The P1 character is decoded in the R register by the transmission interface during a B1 clock time. During the following B2 clock time, if a P2 character combination is decoded at the R register, a send signal is introduced to the communication controller along lead 372. As discussed previously, the byte counter 310 which generates clock signals D1 through D6 operates in synchronism with B1,B2 clock signals. At the D2 clock time, the AD TO character is loaded from the ADR FR section into the encoder 374 and prepared for transmission. After D2 clock time, D3 clock signal appears at lead 376 and since the send signal 372 is in a 1 condition, AND gate 378 is made operative so as to load the ADR FR of the device into the encoder 374. All bytes are loaded into encoder 374 sequentially and are gated by AND gate 380 so as to be transmitted on the data out lead 382.

After the ADR FR character is loaded into the encoder 374, D4 clock time begins to activate either AND gate 383 or 384. In the present example, since the request to transmit lead 360 is in a 0 state, AND gate 383 remains unactivated so that the STX character is not loaded into the encoder. Rather, AND gate 384 is made operative because the ACK transmit lead 366 has a 1 signal lebel. AND gate 384 presents a 1 signal on lead 386 which gates the ACK control code character into the encoder 374 and which is then transmitted in a similar manner as the AD TO and ADR FR character along the data out lead 382.

Subsequent to the ACK character being loaded in the encoder 374, D5 clock time begins. During the D2-D5 clock times the message is gated through AND gate 380 to the cyclic check generator 395. The CC character is gated to the data out lead 382 by means of the D5 clock line input to AND gate 396 by means of the acknowledgement transmission lead 366 being in a 1 state. After the CC character is loaded onto the data out lead 382, the acknowledgement message frame is complete. At this point clock line D6 in combination with the (ACT T) lead 366 cause the generation of an end of transmission (EOT) signal on lead 450. Upon receipt of the EOT signal the transmission interface generates a P1,P2 character set so as to give control to the next terminal on the communications channel.

ERRONEOUS TRANSMISSION

Now the case in which the received message has been identified as containing an error by the cyclic check generator 306 is considered. All processing is as previously discussed for the error-free transmission except that the CC signal on lead 350 would present a 0 level. Accordingly, the ACCEPT signal on lead 352 is not generated because AND gate 400 is not opened. Since the ACCEPT lead 352 does not present a 1 signal on the S lead of the odd-even receive state flip-flop 300, the flip-flop 300 remains in the same state as it was in as a result of the previously received message frame. All the data which is passed on lead 342 to the device prior to the detection of the error by the cyclic check generator 306 is erased as a result of the 1 signal appearing on the erase lead 348, which signal is generated from the absence of the ACCEPT signal on lines 352 as discussed previously.

Since the odd-even receive state flip-flop 300 is not altered from its previous synchronization state, it remains in the odd state by the presence of a signal level on lead 302. Due to the erroneous message identified by the cyclic check generator 306, the ACCEPT lead 352 does not present a 1 signal level to the flip-flop 364. Therefore, the acknowledgement transmission line lead 366 does not present a 1 signal state and consequently, the request to send flip-flop 370 remains in a reset state so as not to present a request to send signal to the transmission interface. Since the request to send signal is not present, an ACK mesage is not returned to the transmitting terminal.

In accordance with the error recovery procedure discussed above, the transmitting terminal would, after waiting for a minimum time-out, determine that an error had occurred somewhere in the transmission of the previous message frame since an ACK has not been received. Therefore, the transmitter will retransmit the previous message to the device under consideration.

In view of the error detected during the decoding of the received message, the odd-even receive state flip-flop 300 remained unchanged. Therefore, the retransmitted message will be processed similar to the original message frame and if a CC error is not found, the data will be passed on to the device by issuing a print signal on lead 346. If the message frame continues to be erroneous, the ACCEPT line will not come up and therefore the data will be erased and the communication controller will operate in a similar manner as with the previous message. This procedure of rejecting erroneous messages is repeated indefinitely until a proper message frame is decoded. It should be recognized by those skilled in the art, that the cyclic check generator decodes errors of both the data and address type since the cyclic check is generated from the entire message frame. This provides a high degree of simplicity in recovering from address errors.

Now, the case in which the ACK message has been properly sent by the device but has been lost in transmission is considered. In this case, the transmitting terminal responds as if the message was never received. After a cycle-out period which for the example under consideration would be the re-appearance of the P1,P2 character combination, the transmitting device would retransmit the previous message frame. The message frame would be received at the transmitter interface and processed as discussed previously, and then be passed through the communications controller. All processing would be the same as for the error-free operation except that since the odd-even receive state flip-flop 300 would be switched to the even synchronization state, both lead 302 and 324 would have 1 signal levels. Thus, AND gate 402 is never opened during the D5 clock time. Accordingly, the REC' lead 340 would be down and all data emanating from the decoder 308 would not be gated to lead 342 by means of AND gate 332. Assuming that the retransmitted message is error-free, the cyclic check generator 306 would present a CC signal indicating an error-free message. Thus, at the D6 clock time, when the P1' signal level is 1 on lead 71 and the CC signal level is also 1, AND gate 400 presents an ACCEPT signal level along lead 352 so as to initiate the request for an ACK message to be retransmitted to the transmitter station. Note, that by means of remembering the odd-even receive state synchronization, the device discards all data which is properly accepted in a previous transmission and responds with another acknowledgement to the transmitting station. Again, this sequence of operations would be repeated as long as the transmitter assumes that a lost transmission has taken place.

TRANSMISSION OF DATA FROM THE DEVICE

Now the case in which the device wishes to transmit a block of data to some other terminal connected on the communications channel is considered. The device initiates the request by placing a 1 signal on the request to transmit line 360. This signal is gated through OR gate 367 and sets the request to send flip-flop 370 to an ON state which passes the request to send signal to the transmission interface. The request to send lead 410, in conjunction with the D2 clock time are utilized to place a 1 signal level on the output of AND gate 362 and thus gate the AD TO to the encoder 374. This AD TO is derived from the device and contains the address of the terminal to which the data is to be forwarded. The ADR FR or the device address is contained in the terminal and is gated to the encoder 374 by the combination of send signal lead 372 and the D3 clock line signal which operate AND gate 378. At the D4 clock time, AND gate 383 is made operative by the request to transmit lead 360. A 1 signal output from AND gate 383 loads the STX control character. All of the characters are gated to the data out lead 382 by means of the AND gate 380. After the D4 clock time, OR gate 412 is activated by the D5 clock signal level so as to permit the data gated through AND gate 392 to be passed through AND gate 414 to OR gate 416 and then to the data OUT line 382. The D5 clock time is up during the first byte of data. Then, all subsequent bytes of data are transmitted during the D6 clock time which is a steady state level present until the transmission (EOT) lead 394 presents a 1 signal level. When the EOT lead 394 contains a 1 signal level, AND gate 414 is degated and AND gate 418 gates the cyclic CC character generated by cyclic check generator 395 to OR gate 416 which presents the check character on the data OUT lead 382. Note, that the address, control character and data are simultaneously passed through OR gate 416 and through the cyclic check generator 394.

After the transmission of the message frame, the device waits for the predetermined time out period for an ACK message to be received. If an ACK is received, the decoder 308 will load the ACK character in the section 316 and the ACK R flip-flop 420 is set to a 1 condition presenting an UP signal level on lead 421. If the cyclic check of the ACK message is correct, the 1 on lead 421 will reset the flip-flop 422 to the next odd or even synchronization state to be utilized for future transmission of message frames.

If after the pre-specified time-out period an ACK message is not received, a NO ACK signal will be present along lead 424 and a repeat signal will be issued by means of AND gate 426 to the device which signal requests that the device present the data contained in the previous transmission so that it may be retransmitted. The device will continue to retransmit the same message frame until a proper ACK message frame is received.

What is claimed is:

1. A communications controller for use in a transmitter-receiver terminal connected in a communications network interconnecting at least two terminals, said communications controller comprising:

means for formatting digital information into a message frame to be transmitted to a receiving terminal by placing in said message frame, framing information, address information, control information, data information and error detection information;

means for receiving message frames and processing those message frames having proper address information;

error detection means connected to said means for receiving for detecting errors associated with a received message frame by processing all but the framing information that is present in the received message frame;

acknowledgement response means for transmitting an acknowledgement message in response to an indication by said error detection means that an error-free message frame has been received;

timing means for determining the expiration of a cycle-out period during which said acknowledgement message is to be received;

acknowledgement decode means for properly decoding said acknowledgement message;

control means responsive to said acknowledgement decode means, said errpr detection means, and said timing means, for indicating to said terminal to continue transmitting or receiving digital information;

automatic retransmission means responsive to said timing means for causing retransmission of the prior sent message frame when an expected acknowledgement message has not been received at said terminal prior to expiration of said cycle-out period.

2. The communications controller as defined in claim 1 wherein said timing means comprises:

means for generating an access control framing character associated with said message frame;

means for decoding said access control framing character;

means for activating said automatic retrans-mission means when said framing character is decoded prior to the receipt of an expected acknowledgement response message.

3. The communications controller as defined in claim 1 wherein said error detection information as defined in claim 1 generated by means comprising:

redundancy check means for processing all digital information contained in said message frame and developing a cyclic redundancy check character;

frame synchronization means responsive to said error detection means and said acknowledgement decode means,for providing a state condition indicative of the synchronization state of said communications controller.

4. The communications controller as defined in claim 2 wherein said error detection means comprises:

redundancy check generating means for processing all information other than framing information and generating an error-free message signal;

test means for examining said error-free message signal.

5. The communications controller as defined in claim 3 further comprising:

synchronization check means responsive to said error detection means, said framing information, and said means for receiving, for determining if said state condition indicates proper synchronization of the received message frame;

switch means responsive to said synchronization check means for controlling the passage of the message frame data to said terminal.

6. The communications controller as defined in claim 5 further comprising:

erase means responsive to said error detection means and said synchronization check means for discarding a received message which has associated therewith either a state condition which indicates a synchronization state error or the absence of an error-free message signal.

* * * * *